Oct. 14, 1952 C. F. LOUTHAN ET AL 2,613,863
APPARATUS FOR CHARGING AND SEALING TUBING WITH SOLDER
Filed April 30, 1946

INVENTORS
Chester F Louthan
George B Long
BY
Spencer Hardman and Fehr
attorneys

Patented Oct. 14, 1952

2,613,863

UNITED STATES PATENT OFFICE 2,613,863

APPARATUS FOR CHARGING AND SEALING TUBING WITH SOLDER

Chester F. Louthan and George B. Long, Dayton, Ohio, assignors to General Motors Corporation, Dayton, Ohio, a corporation of Delaware Application April 30, 1946, Serial No. 665,984

2 Claims. (Cl. 226—20.6)

1

This invention relates to an apparatus for charging containers such as may be used for controls in refrigerating apparatus.

In charging containers it is customary to connect the charging tube to a charging device and by alternately evacuating and charging the container is filled. After this the charging tube is pinched or crimped, cut off and soldered with an acid flux and soft solder. In this method the flux is objectionable and the appearance is not altogether satisfactory. Some difficulty is also had with leaks. The process also requires considerable handling.

An object of our invention is to provide a simple, less expensive and improved apparatus for charging containers and sealing the charging tube.

It is another object of our invention to provide a more rapidly functioning apparatus for charging containers and sealing the charging tube which reduces the number of leaks and yet provides a sealed tube end of improved appearance.

Another object of our invention is to provide an apparatus for charging containers and sealing the charging tube which reduces the amount of handling required.

Briefly, to attain these objects we cut off the tubing connected to the container to provide the desired length of charging tube. After this a piece of solder is inserted into the end of the tube which is then inserted into a charging fixture. Thereafter by alternate evacuation and charging the container and the charging tube are filled with the desired fluid (preferably a vapor) and while maintaining this fluid at the desired pressure in the container and the charging tube, the end of the tubing containing the solder is heated by a high frequency induction apparatus to melt the solder and seal the end of the charging tube.

Further objects and advantages of the present invention will be apparent from the following description, reference being had to the accompanying drawing, wherein a preferred form of the present invention is clearly shown.

Figure 1:
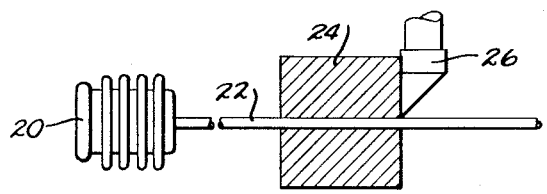
Fig. 1 is a view, partly diagrammatic, showing the cutting of the tubing to the desired length.

Referring now to the drawings, there is shown in Fig. 1 a container, such as a bellows 20, connected to tubing 22. Such an assembly is used as the thermostatic element in many different types of controls such as are used for various sorts of temperature regulation. However, the invention is applicable to other sorts of containers which are filled through a tube. The tubing 22 extends through a cutting block 24 and is cut to the desired length by the shearing knife 26. After this a square or triangular, or other shape, piece of solder preferably one-fourth to one-half inch long is inserted into the end of the charging tube 22. Thus the piece of solder 48 is several times greater in length but slightly smaller in thickness than the interior diameter of the tubing 22. Then the charging tube 22 is inserted into the charging fixture as shown in Fig. 2.

This charging fixture includes a charging block 28 containing a tube sealing grommet 30 of a suitable natural or synthetic rubber material held in place by a gland nut 32. On the side opposite the gland nut 32, the block 28 has a tube 34 with a closed end. This tube 34 is of heat resistant glass or some other suitable non-magnetic material, preferably one which will not be heated to any material degree by high frequency induction. The interior of the tube 34 is sealed to the block and connected by the passages 36 with the tubing 38 and the valve 40 which is connected to the charging apparatus 42. The interior of the tube sealing grommet 30 is connected under the control of a suitable valve 44 to a source of pressure 46, such as an air-pressure line.

Figure 2:
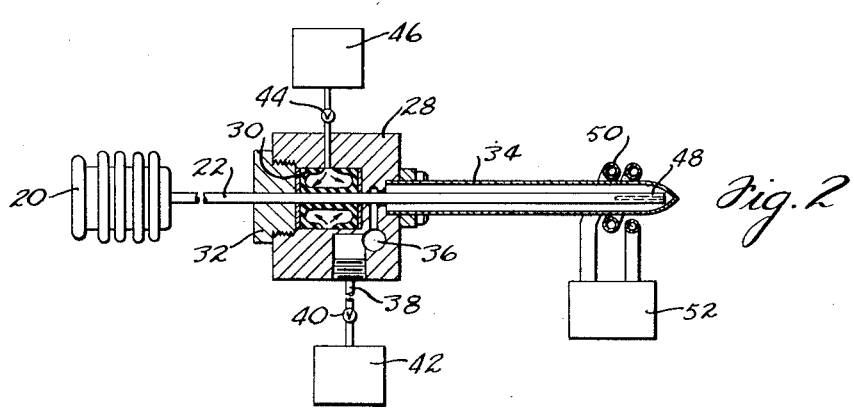
Fig. 2 is a sectional view, partly diagrammatic, of the charging apparatus with the charging tube containing the solder inserted therein.

After the tube 22 is inserted in place in the charging apparatus, as shown in Fig. 2, the valve 44 is opened to apply pressure to the interior of the tube sealing grommet 30. This pressure is maintained throughout the charging and sealing operation to provide a seal between the charging block 28 and the tube 22. This seals the interior of the tube 34. The charging apparatus 42 and the valve 40 are then manipulated so as to introduce the fluid (preferably a vapor) to be charged through the tube 38 and the passages 36 which lead to the interior of the tube 34. Since the piece of solder 48 is of square or triangular shape the flow of fluid from the interior of the tube 34 into and out of the tube 22 and the bellows 20 is comparatively free and unrestricted.

Figure 3:
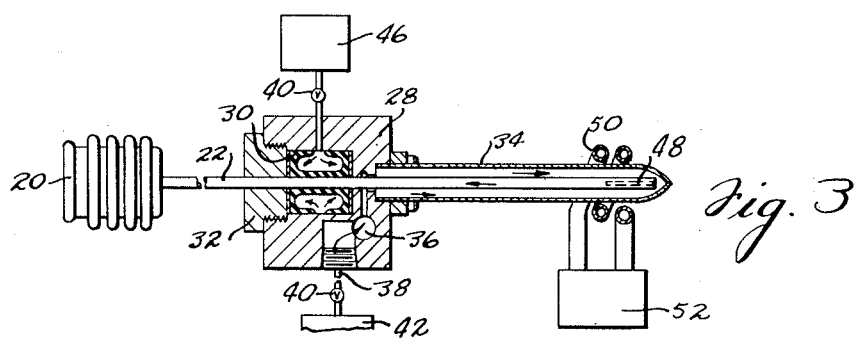
Fig. 3 is a similar view illustrating the charging of the container and charging tube.

The charging apparatus 42 and the valve 40 are first manipulated to evacuate the passages 36 and the interior of the tube 34 as well as the interior of the tube 22 and the bellows 20. The fluid for charging the bellows is then introduced from the charging apparatus under the control of the valve 40 and is conducted through the tube 38, the passages 36 and passes around the piece of solder 48 into the tube 22 and the bellows 20 as illustrated in Fig. 3. This evacuation and charging is carried on alternately until the fluid (preferably a vapor) desired in the bellows 20 and the tubing 22 is substantially pure.

Figure 4:
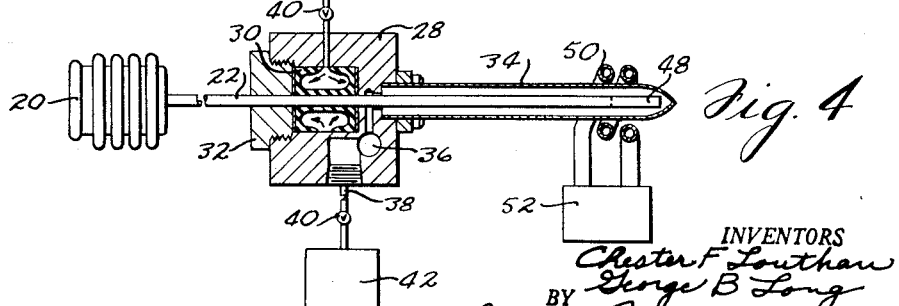
Fig. 4 is a similar view illustrating the application of the high frequency heating to the end of the charging tube.

Wrapped around the end of the tube 34 is a high frequency inductor coil 50 connected to a suitable high frequency generator 52. While it would be possible to place this coil within the tube 34, it is much simpler to place the tube 50 on the outside of the tube 34, so that no sealing problems are encountered. The pressure of the fluid (preferably a vapor) desired in the tube 22 and the bellows 20 is maintained by the charging apparatus 42 and the valve 40, and while so maintained the high frequency generator 52 is operated to apply a high frequency current to the inductor coil 50 which, by the familiar high frequency induction heating method, heats the piece of solder 48 within the end of the tubing 22 as well as the end of the tubing 22 and causes the piece of solder 48 to become molten and seal the end of the tube 22, as shown in Fig. 4. The high frequency current is then shut off and upon solidification of the solder the valve 40 is closed and the valve 44 is manipulated to relieve the pressure within the tube sealing grommet, permitting the withdrawal of the bellows 20 and the sealed charging tube 22 from the charging apparatus.

By this apparatus, in addition to cutting off the tube to the desired length, the only handling required is to insert the piece of solder 48 and to insert and thereafter withdraw the bellows and tube assembly into and from the charging apparatus. The charging is done with a minimum effort and the soldering is likewise done with a minimum of effort. In fact these two operations may be performed automatically. Much less trouble with leakage is encountered and no flux is required for the solder. The flux is objectionable since it is corrosive and if not removed by washing off or other methods, it may eventually cause sufficient corrosion to produce a leak. The appearance of the tube is not marred by pinching or crimping. The operation is rapid since little handling is required, and both the charging and soldering are performed in the same apparatus. A wide variety of solders may be used. Only one cutting operation is required. No trimming for appearance is necessary and therefore no tubing is wasted or required to be scrapped.

The piece of solder 48 may be initially held in place within the end of the tube 22 by fitting snugly therein or the tube 22 may be deformed slightly after the piece of solder 48 is inserted to clamp it in place. In any case before soldering, a passage must be left by-passing the piece of solder 48 permitting ingress and egress of the gas into and out of the tube 22. This may be done by making the solder 48 thinner than the interior of the tube 22 in one or more directions. For example, the piece of solder 48 may be flattened on one or more sides or bent longitudinally, or it may be smaller in diameter and held merely by a slight distortion of the tubing 22 such as a slight bend or slight flattening, or by a small punch mark therein.

While the form of embodiment of the invention as herein disclosed, constitutes a preferred form, it is to be understood that other forms might be adopted, as may come within the scope of the claims which follow.

What is claimed is as follows:

1. A charging and sealing apparatus including a charging housing having projecting therefrom a sealed hollow substantially horizontal tube of transparent vitreous material having a closed end, said housing having an opening therethrough in alignment with and opposite said closed end of this hollow tube, a sealing device in said opening having a passage therethrough in alignment with said opening and said hollow tube, said passage in said sealing device and said hollow tube having a substantially horizontal axis and being capable of receiving a substantially horizontal end portion of metal tubing containing a piece of solder, a fluid charging device connected to the interior of said charging housing and said tube for forcing a fluid into said metal tubing, and a high frequency heating device having a short small diameter high frequency heating coil extending around and closely adjacent to the end portion of the outside of said hollow tube for heating only the portion of the metal tubing containing the solder to cause the solder to flow into sealing relationship to seal the tubing when the flow charging is completed.

2. A charging and sealing apparatus including a charging housing having projecting therefrom a sealed hollow tube of transparent vitreous material in the shape of a hollow finger, said tube having a closed end, said housing having an opening therethrough in alignment with and opposite said closed end of the hollow tube of vitreous material, a sealing device in said opening having a passage extending therethrough in alignment with said opening and said hollow tube, said passage in said sealing device and said hollow tube being capable of receiving an end portion of tubing containing a piece of sealing material, a fluid charging device connected to the interior of said charging housing and said tube for forcing a fluid into said tubing, and a high frequency heating device having a short small diameter high frequency heating coil extending around and closely adjacent to the end portion of the outside of said hollow tube for heating only the portion of the tubing containing the sealing material for heating and melting the sealing material in the tubing to seal the tubing.

CHESTER F. LOUTHAN.
GEORGE B. LONG.

REFERENCES CITED

The following references are of record in the file of this patent:

UNITED STATES PATENTS

| Number | Name | Date |
|---|---|---|
| 1,201,929 | Bolus | Oct. 17, 1916 |
| 1,679,386 | Tenney | Aug. 7, 1928 |
| 1,893,380 | Uschman et al. | Jan. 3, 1933 |
| 1,911,410 | Valverde | May 30, 1933 |
| 2,059,931 | Cate | Nov. 3, 1936 |
| 2,262,176 | Geiger et al. | Nov. 11, 1941 |
| 2,381,764 | McFarland, Jr. | Aug. 7, 1945 |
| 2,427,747 | Schneider et al. | Sept. 23, 1947 |